Patented Sept. 20, 1938

2,130,451

UNITED STATES PATENT OFFICE 2,130,451

PROCESS FOR THE PREPARATION OF VINYL DERIVATIVES

Georges E. Zelger, Montreuil-sous-Bois, Seine, France, assignor, by mesne assignments, to Eastman Kodak Company, Jersey City, N. J., a corporation of New Jersey No Drawing. Application May 16, 1935, Serial No. 21,878. In France May 23, 1934

16 Claims. (Cl. 260—2)

This invention relates to a process for the preparation of condensation products of a polyvinyl alcohol and an aldehyde, in the presence of a catalyst. In particular, this invention relates to a process for the preparation of condensation products of a polyvinyl alcohol and an aldehyde which gives solutions of high, practically maximum viscosity in suitable organic solvents.

This application is a continuation-in-part of my copending application Serial No. 706,099, filed January 10, 1934.

Condensation products of a polyvinyl alcohol and an aldehyde obtained according to known processes have various disadvantages. For example, certain of these condensation products are insoluble in all solvents, while others are soluble, but give rise to solutions of relatively low viscosity. Such solutions of lower viscosity are unsatisfactory for many purposes. In fact, it is essential, in the manufacture of films, filaments, threads and the like from these condensation products, to employ condensation products which are entirely soluble in suitable solvents and in addition give solutions of high viscosity with these solvents.

Now, I have found that condensation products of a polyvinyl alcohol and an aldehyde which give solutions of high, practically maximum viscosity with suitable organic solvents, such as a mixture of four volumes of methylene chloride and one volume of pure ethyl alcohol, ethylene chloride, tetrachlorethane chloroform or other suitable organic solvents, preferably mixed with a small amount of alcohol, can be prepared by effecting the condensation in the presence of an amount of catalyst slightly in excess of that amount necessary to produce a condensation product just insoluble in the suitable organic solvent, previously selected. I have also found that this amount of catalyst can be varied only within narrow limits, if the resulting condensation product is to form solutions of high, practically maximum viscosity.

The object of this invention, therefore, is to provide condensation products of a polyvinyl alcohol and an aldehyde which give solutions of high, practically maximum viscosity with suitable organic solvents. A further object is to provide a process for the preparation of such vinyl condensation products. Other objects will appear hereinafter.

According to my invention, the maximum amount of catalyst, which gives a condensation product just insoluble in the chosen organic solvent, is determined by trial condensations, using progressively larger amounts of catalyst. Then for the desired condensation product, an amount of catalyst just slightly in excess of that amount previously determined is employed. If the catalyst is hydrogen chloride and if the condensation is effected at ordinary temperatures, that is, about 20° C., the excess of catalyst is equal to less than 1% of the weight of the total reaction mass. (See Example 1.)

It has proven more satisfactory to approach the transition point, solubility-insolubility, from the insoluble side. As the amount of catalyst is increased for the successive trial condensations, the condensation products become softer and softer when in contact with the solvent and tend to disperse more and more therein, until finally a product is obtained which appears to give a homogeneous dispersion in the solvent. Close examination reveals, however, that this mixture is not homogeneous but rather is made up of small swollen particles of the condensation product dispersed throughout the solvent. If now, the amount of catalyst is but slightly increased for the next condensation, a product is obtained which is entirely soluble and the resulting solution is of a high, practically maximum viscosity. Larger amounts of catalyst give rise to condensation products which form solutions of definitely lower viscosity. If the catalyst employed is hydrogen chloride, I have found the excess to be employed in the final condensation to vary between about 0.3% and about 1% of the weight of the total reaction mass.

The following examples serve to illustrate my invention, but are not intended to be limiting. In these examples, the polyvinyl alcohols are defined by indicating the Engler viscosity of their 4% aqueous solutions at 15° C. and the concentration of catalyst is expressed as a percent of the weight of the total reaction mass. (See Example 1.)

*Example 1.*—100 g. of a polyvinyl alcohol (Engler viscosity 63) were dissolved in 1 liter of water, 35 grams of trioxymethylene were added and to the resulting mixture, 300 cc. of hydrochloric acid (sp. gr. 1.19) were introduced. This quantity of hydrochloric acid weighed 357 g. and since 37% of the acid was hydrogen chloride, 132 g. of hydrogen chloride had been introduced. Thus the amount of hydrogen chloride (132 g.) was equal to 8.8% of the total reacting mass (1492 g.). The mixture was stirred or otherwise agitated and allowed to react at about 20° C. At the end of from one to two hours, the trioxymethylene went into solution, giving a transparent liquid. At the end of several hours a white compact mass of the vinyl condensation product precipitated. This product was washed and dried. It was completely soluble in a mixture of four volumes of methylene chloride and one volume of pure ethyl alcohol, a 2% solution having an Engler viscosity of 64 at 14° C.

With a concentration of hydrogen chloride equal to 10% of the total reacting mass, the vinyl condensation product gives a solution in a mixture of four volumes of methylene chloride and one volume of pure ethyl alcohol which is very fluid and of lower viscosity. With a concentration of 8%, the product is incompletely soluble, giving a gel which is not homogeneous.

*Example 2.*—100 g. of polyvinyl alcohol (Engler viscosity 97) were treated as in Example 1, but in the presence of 12% hydrogen chloride. The vinyl condensation product gave a 2% solution in a mixture of four volumes of methylene chloride and one volume of pure ethyl alcohol having an Engler viscosity of 65 at 15° C., such a viscosity being the maximum obtained with a polyvinyl alcohol of this degree of polymerization.

With a concentration of hydrogen chloride equal to 11% of the total reacting mass, the vinyl condensation product was quite insoluble in a mixture of four volumes of methylene chloride and one volume of pure ethyl alcohol.

*Example 3.*—100 g. of a polyvinyl alcohol (Engler viscosity 38) were treated as in Example 1, but in the presence of 7% hydrogen chloride. The vinyl condensation product gave a 2% solution in a mixture of four volumes of methylene chloride and one volume of pure ethyl alcohol having an Engler viscosity of 30 at 15° C., such a viscosity being the maximum obtained with a polyvinyl alcohol of this degree of polymerization.

With a concentration of hydrogen chloride equal to 6.7% of the total reacting mass, the vinyl condensation product was insoluble in a mixture of four volumes of methylene chloride and one volume of pure ethyl alcohol, giving rise to swollen particles which dispersed but did not dissolve to give a solution.

*Example 4.*—100 g. of a polyvinyl alcohol (Engler viscosity 63) were treated as in Example 1, but at a temperature of 60° to 80° C., and in the presence of 15.5% hydrogen chloride. The vinyl condensation product gave a 2% solution in a mixture of four volumes of methylene chloride and one volume of pure ethyl alcohol having an Engler viscosity of 48 at 15° C.

With a concentration of hydrogen chloride equal to 12.5% of the total reacting mass, the vinyl condensation product is incompletely soluble in a mixture of four volumes of methylene chloride and one volume of pure ethyl alcohol.

*Example 5.*—100 g. of a polyvinyl alcohol (Engler viscosity 63) were treated as in Example 1, but in the presence of 25% of hydrogen sulfate. The vinyl condensation product gave a 2% solution in a mixture of four volumes of methylene chloride and one volume of pure ethyl alcohol having an Engler viscosity of 45 at 15° C.

With a concentration of hydrogen sulfate equal to 23.5% of the total reacting mass, the vinyl condensation product is incompletely soluble in a mixture of four volumes of methylene chloride and one volume of pure ethyl alcohol.

From these examples it can be seen that the absolute amount of hydrogen chloride necessary to produce a condensation product of a polyvinyl alcohol and an aldehyde which gives a solution of high practically maximum viscosity with a mixture of four volumes of methylene chloride and one volume of pure ethyl alcohol varies between about 7% and 12% of the weight of the total reaction mass, depending upon the particular polyvinyl alcohol employed and when the condensation is effected at ordinary temperatures. At higher temperatures, that is from about 60° C. to about 80° C., the absolute amount of hydrogen chloride is somewhat higher varying from about 14% to about 20%.

From these examples, it can also be seen that the amount of catalyst necessary to produce a condensation product of a particular polyvinyl alcohol and an aldehyde which dissolved completely in a suitable, previously selected organic solvent and gives therewith a solution of high practically maximum viscosity is just slightly in excess of that necessary to produce a condensation product just insoluble in the previously selected organic solvent. Further, it can be seen that the absolute amount of catalyst which gives rise to the desirable condensation product can be varied within but narrow limits.

It is to be noted that my invention is not limited to the above examples, nor to the choice of the bodies employed, nor to catalysts, the proportions indicated for catalysts falling according to the bodies employed and according to the nature of the catalysts. At ordinary temperatures i. e. about 20° C. where A% represents the amount of hydrogen chloride, based on the weight of the total reacting mass, necessary to produce a condensation product of a polyvinyl alcohol and an aldehyde just insoluble in a previously selected organic solvent, from about $(A+0.3)\%$ to about $(A+1.0)\%$ of hydrogen chloride, based on the weight of the total reacting mass, produces a condensation product of a polyvinyl alcohol and an aldehyde which gives a solution of high, practically maximum viscosity in the previously selected organic solvent.

In the claims, the polyvinyl alcohols are defined by indicating the Engler viscosities of their 4% aqueous solutions at 15° C. and the amounts of catalyst are indicated as a percent of the weight of the total reaction mass. (See Example 1.) The term aldehyde is intended to mean an aldehyde in either its monomeric or its polymeric form e. g. formaldehyde is intended to mean either monomeric formaldehyde or one of its polymers such as trioxymethylene.

What I claim as my invention and desire to be secured by Letters Patent of the United States is:

1. A process for the preparation of a condensation product of a polyvinyl alcohol and an aldehyde which gives a solution of high viscosity in a previously selected organic solvent comprising condensing a polyvinyl alcohol with an aldehyde, in the presence of about $(A+0.3)$ percent to about $(A+1)$ per cent by weight of a catalyst, based on the total weight of the reaction mass, where A percent represents the amount of catalyst necessary to produce a condensation product just insoluble in the previously selected organic solvent.

2. A process for the preparation of a condensation product of a polyvinyl alcohol and formaldehyde which gives a solution of high viscosity in a previously selected organic solvent comprising condensing a polyvinyl alcohol with formaldehyde, in the presence of about $(A+0.3)$ percent to about $(A+1)$ percent by weight of a catalyst, based on the total weight of the reaction mass, where A per cent represents the amount of catalyst necessary to produce a condensation product just insoluble in the previously selected organic solvent.

3. A process for the preparation of a condensation product of a polyvinyl alcohol and an aldehyde which gives a solution of high viscosity in a previously selected organic solvent comprising condensing a polyvinyl alcohol with an aldehyde, in the presence of about $(A+0.3)$ percent to about $(A+1)$ percent by weight of acid catalyst, based on the total weight of the reaction mass, where A percent represents the amount of acid catalyst necessary to produce a condensation product just insoluble in the previously selected organic solvent.

4. A process for the preparation of a condensation product of a polyvinyl alcohol and formaldehyde which gives a solution of high viscosity in a previously selected organic solvent comprising condensing a polyvinyl alcohol with formaldehyde, in the presence of about (A+0.3) percent to about (A+1) percent by weight of acid catalyst, based on the total weight of the reaction mass, where A percent represents the amount of acid catalyst necessary to produce a condensation product just insoluble in the previously selected organic solvent.

5. A process for the preparation of a condensation product of a polyvinyl alcohol and an aldehyde which gives a solution of high viscosity in a previously selected organic solvent comprising condensing a polyvinyl alcohol with an aldehyde, in the presence of from about (A+0.3) percent to about (A+1) percent by weight of hydrogen chloride, based on the total weight of the reaction mass, where A percent represents the amount of hydrogen chloride necessary to produce a condensation product just insoluble in the previously selected organic solvent.

6. A process for the preparation of a condensation product of a polyvinyl alcohol and formaldehyde which gives a solution of high viscosity in a previously selected organic solvent comprising condensing a polyvinyl alcohol with formaldehyde, in the presence of from about (A+0.3) percent to about (A+1) percent by weight of hydrogen chloride, based on the total weight of the reaction mass, where A percent represents the amount of hydrogen chloride necessary to produce a condensation product just insoluble in the previously selected organic solvent.

7. A process for the preparation of a condensation product of a polyvinyl alcohol and an aldehyde which gives a solution of high viscosity in a mixture of about four volumes of methylene chloride and about one volume of ethyl alcohol comprising condensing a polyvinyl alcohol with an aldehyde, in the presence of from about (A+0.3) per cent to about (A+1) per cent by weight of hydrogen chloride, based on the total weight of the reaction mass, where A per cent represents the amount of hydrogen chloride necessary to produce a condensation product just insoluble in the mixture of about four volumes of methylene chloride and about one volume of ethyl alcohol.

8. A process for the preparation of a condensation product of a polyvinyl alcohol and an aldehyde which gives a solution of high viscosity in a mixture of about four volumes of methylene chloride and about one volume of ethyl alcohol comprising condensing a polyvinyl alcohol with formaldehyde, in the presence of from about (A+0.3) per cent to about (A+1) per cent by weight of hydrogen chloride, based on the total weight of the reaction mass, where A per cent represents the amount of hydrogen chloride necessary to produce a condensation product just insoluble in the mixture of about four volumes of methylene chloride and about one volume of ethyl alcohol.

9. A process for the preparation of a condensation product of a polyvinyl alcohol and an aldehyde which gives a solution of high viscosity in a mixture of about four volumes of methylene chloride and about one volume of ethyl alcohol comprising condensing, at about 20° C., a polyvinyl alcohol with an aldehyde, in the presence of from about (A+0.3) per cent to about (A+1) per cent by weight of hydrogen chloride, based on the total weight of the reaction mass, where A per cent represents the amount of hydrogen chloride necessary to produce a condensation product just insoluble in the mixture of about four volumes of methylene chloride and about one volume of ethyl alcohol.

10. A process for the preparation of a condensation product of a polyvinyl alcohol and an aldehyde which gives a solution of high viscosity in a mixture of about four volumes of methylene chloride and about one volume of ethyl alcohol comprising condensing, at about 20° C., a polyvinyl alcohol with formaldehyde in the presence of from about (A+0.3) per cent to about (A+1) per cent by weight of hydrogen chloride, based on the total weight of the reaction mass, where A per cent represents the amount of hydrogen chloride necessary to produce a condensation product just insoluble in the mixture of about four volumes of methylene chloride and about one volume of ethyl alcohol.

11. A process for the preparation of a condensation product of a polyvinyl alcohol and an aldehyde comprising condensing a polyvinyl aldehyde of Engler viscosity about 38 with an aldehyde, in the presence of about 7 per cent by weight of hydrogen chloride, based on the weight of the total reaction mass, at about 20° C.

12. A process for the preparation of a condensation product of a polyvinyl alcohol and formaldehyde comprising condensing a polyvinyl alcohol of Engler viscosity about 38 with formaldehyde, in the presence of about 7 per cent by weight of hydrogen chloride, based on the total weight of the reaction mass, at about 20° C.

13. A process for the preparation of a condensation product of a polyvinyl alcohol and an aldehyde comprising condensing a polyvinyl alcohol of Engler viscosity of about 63 with an aldehyde, in the presence of about 8.8 per cent by weight of hydrogen chloride, based on the total weight of the reaction mass, at a temperature of about 20° C., and in the presence of about 15.5 per cent by weight of hydrogen chloride, based on the total weight of the reaction mixture, at from about 60° C. to about 80° C.

14. A process for the preparation of a condensation product of a polyvinyl alcohol and formaldehyde comprising condensing a polyvinyl alcohol of Engler viscosity of about 63 with formaldehyde, in the presence of about 8.8 per cent by weight of hydrogen chloride, based on the total weight of the reaction mass, at a temperature of about 20° C. and in the presence of about 15.5 per cent by weight of hydrogen chloride, based on the total weight of the reaction mixture, at from about 60° C. to about 80° C.

15. A process for the preparation of a condensation product of a polyvinyl alcohol and an aldehyde comprising condensing a polyvinyl alcohol of Engler viscosity of about 97 with an aldehyde, in the presence of about 12 per cent by weight of hydrogen chloride, based on the total weight of the reaction mass, at about 20° C.

16. A process for the preparation of a condensation product of a polyvinyl alcohol and formaldehyde comprising condensing a polyvinyl alcohol of Engler viscosity about 97 with formaldehyde, in the presence of about 12 per cent by weight of hydrogen chloride, based on the total weight of the reaction mixture, at about 20° C.

GEORGES E. ZELGER.